S. A. RANKIN.
Cane-Stripper.
No. 68,458.
Patented Sept. 3, 1867.
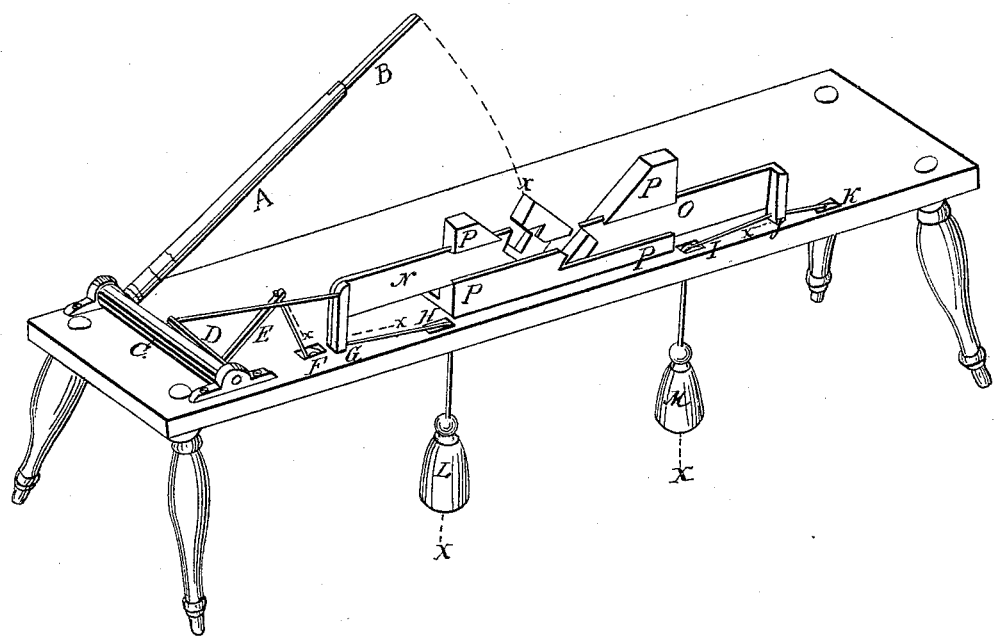
Witnesses:
Joseph Ridge
A S Wallack
Inventor:
Samuel A Rankin

United States Patent Office.

SAMUEL A. RANKIN, OF FAIRHAVEN, OHIO.

Letters Patent No. 68,458, dated September 3, 1867.

IMPROVEMENT IN MACHINE FOR STRIPPING SORGHUM.

The Schedule referred to in these Letters Patent and making part of the same.

TO ALL WHOM IT MAY CONCERN:

Be it known that I, SAMUEL A. RANKIN, of Fairhaven, county of Preble, and State of Ohio, have invented a new and useful Improvement in Machines for Stripping Sorghum; and I do hereby declare that the following is a full, clear, and exact description of the same, reference being had to the accompanying drawings, making a part of this specification.

To enable others skilled in the art to make and use my invention, I will proceed to describe its construction and operation.

The stripping devices are arranged on a bench or structure, which is elevated on legs to a suitable height to admit of a sufficient movement of the weights L and M, and for the convenience of the operator. N and O are slides operating in channels in the vertical plate P, which latter is rigidly secured to the bench by screws through flanges attached to said plate. The slides N and O are drawn together by the weights L and M, and are separated by the action of roller C, the manner of said operations being as follows: A cord connected with the end of arm E, (said arm being rigidly attached to roller C,) passes through the bench on pulley F, thence underneath the bench to pulley K, and passing up over the latter pulley, connects with slide O at J, and thence over pulley I, is attached to weight M. The arm D, (also rigidly attached to roller C,) is connected by a cord with slide N, and a cord passing over pulley H also connects the weight L with slide N, at G. The lever A is provided with a knife, B, at its end. The said lever being rigidly attached to roller C, serves to operate the latter and the arms D and E attached thereto. The operation of raising lever A draws the slides N and O to the positions, (as shown in the drawings,) when a stalk of the cane may be placed in each of the angular recesses in plate P, "at the ends of the slides," with the heads of the cane in the direction of lever A, and sufficiently under said lever to admit of the heads of the cane being severed by knife B, as the latter is allowed to descend rapidly on the bench. When lever A falls, the slides N and O are drawn by the action of the weights against the stalks, thus grasping the latter tightly between the bifurcated ends of the slides and the recesses in plate P, the said slides being so arranged that the angles of their ends are adapted to each other in such a manner as to permit the said slides to approach each other closely, as may be seen by the drawing. When lever A has been allowed to fall, and the stalks clasped by the slides, the operator grasps the severed ends of the stalks, one in each hand, and pulls them through, thus stripping two stalks at one time.

Having thus fully described my invention, what I claim, and desire to secure by Letters Patent, is—

1. I claim the arrangement of the slides N and O, operated by weights and cords, in combination with plate P, or an equivalent of the latter, all substantially as described and for the purpose set forth.

2. I claim the combination of the plate P, slides N and O, and knife B, substantially as described and for the purpose set forth.

3. I claim a combination of the whole, substantially as herein set forth and for the purpose specified.

SAMUEL A. RANKIN.

Witnesses:
    JOSEPH RIDGE,
    A. S. MATLACK.